United States Patent
Katsuki et al.

(10) Patent No.: US 6,228,336 B1
(45) Date of Patent: May 8, 2001

(54) DUST COLLECTING METHOD

(75) Inventors: Yasuo Katsuki, Sapporo; Takashi Ohnishi, Yufutsu-gun; Shozo Kaneko, Tokyo; Akira Hashimoto, Nagasaki; Yuichi Fujioka, Nagasaki; Kikuo Tokunaga, Nagasaki; Toshihiko Setoguchi, Nagasaki, all of (JP)

(73) Assignees: Hokkaido Electric Power Company, Inc., Hokkaido; Mitsubishi Heavy Industries, Ltd., Tokyo, both of (JP)

( * ) Notice: Subject to any disclaimer, the term of this patent is extended or adjusted under 35 U.S.C. 154(b) by 0 days.

(21) Appl. No.: 09/373,579

(22) Filed: Aug. 13, 1999

Related U.S. Application Data

(62) Division of application No. 09/038,844, filed on Mar. 12, 1998, now abandoned.

(30) Foreign Application Priority Data

Mar. 18, 1997 (JP) ..................................................... 9-064450

(51) Int. Cl.$^7$ ................................. B01J 8/00; C01B 7/00; B01D 45/00; B01D 46/46; B01D 46/00
(52) U.S. Cl. ................. 423/244.07; 423/244.08; 423/215.5; 95/19; 95/22; 95/285
(58) Field of Search .......................... 423/244.07, 244.08, 423/215.5; 95/19, 22, 285

(56) References Cited

U.S. PATENT DOCUMENTS

| | | | |
|---|---|---|---|
| 5,198,006 | * | 3/1993 | Mimori et al. .......................... 55/523 |
| 5,344,629 | | 9/1994 | Engstrom ........................ 423/239.1 |
| 5,378,443 | * | 1/1995 | Engstrom et al. ................ 423/239.1 |
| 5,439,658 | * | 8/1995 | Johnson et al. ................. 423/243.07 |
| 5,439,659 | | 8/1995 | Izumo ................................... 422/169 |
| 5,961,931 | * | 10/1999 | Ban et al. ............................. 422/171 |

FOREIGN PATENT DOCUMENTS

| | | |
|---|---|---|
| 3634360 | 10/1991 | (DE) . |
| 0207070 | 12/1986 | (EP) . |
| 0362015 | 4/1990 | (EP) . |
| 0550905A | 7/1993 | (EP) . |
| 0611590A1 | 8/1994 | (EP) . |
| 2174082 | 10/1986 | (GB) . |
| 97/29168 | 8/1997 | (WO) . |

* cited by examiner

Primary Examiner—Steven P. Griffin
Assistant Examiner—Jonas N. Strickland
(74) Attorney, Agent, or Firm—Wenderoth, Lind & Ponack, L.L.P.

(57) ABSTRACT

A dust collecting apparatus and method for dedusting a Ca-containing gas using a ceramics filter is provided, in which a filter differential pressure elevation rate is suppressed. A desulfurizing agent 103 and a mineral 106 containing MgO are supplied via a hopper 13, 15 a valve 14 and a feeder 16 into a pressurized fluidized-bed combustion furnace 1 together with coal 101 and air 102. A combustion gas 201 is dedusted by a cyclone 2 to become a combustion gas 301, the combustion gas 301 enters a filter container 3a, 3b having a ceramics filter 31a, 31b and is further dedusted. A combustion gas 401 which is dedusted is supplied into a gas turbine 4 to generate power, and combustion gas 501 heats a waste heat recovery boiler 5 which in turn drives a steam turbine 7. The mineral 106 containing MgO is added in the combustion gas 301 which flows in the ceramics filter 31a, 31b. Thereby MgO is added to the combustion gas so that the filter differential pressure elevation rate can be suppressed. The more MgO that is supplied, the greater the effect becomes, and an operation stop due to the differential pressure elevation is eliminated.

11 Claims, 7 Drawing Sheets

DUST COLLECTING METHOD

This is a divisional application of U.S. patent application Ser. No. 09/038,844, filed Mar. 12, 1998. Which is now abandoned.

BACKGROUND OF THE INVENTION

1. Field of the Invention

The present invention relates to a dust collecting apparatus for dedusting a Ca-containing gas by a ceramics filter and an operation method thereof.

2. Description of the Prior Art

A ceramics filter is appropriate for collecting dust contained in a high temperature gas. Especially in a pressurized fluidized-bed combustion power generation system as shown in FIG. 7, the ceramics filter provided therein is effective for reducing the wear rate of the gas turbine blade material and reducing dust in the combustion waste gas to be discharged into the air.

A prior art dust collecting apparatus will be described with reference to FIG. 7. In FIG. 7, coal 101, supplied air 102 and a desulfurizing agent 103 are supplied into a pressurized fluidized-bed combustion furnace 1. The desulfurizing agent 103 is first supplied into a hopper 15 through a valve 14 which is open. Then the valve 14 is closed and the hopper 15 is pressurized by a gas (not shown) so that a pressure in the hopper 15 and that in a hopper 13 become equal to each other. Then a valve 12 is opened and the desulfurizing agent 103 is caused to fall into the hopper 13. The desulfurizing agent 103 is metered by a feeder 16 and is carried with a gas flow to be mixed into air 105 so that a mixture 104 of the air and the desulfurizing agent is supplied into the pressurized fluidized-bed combustion furnace 1.

The coal 101 is fluidized by the supplied air 102 to be combusted. $SO_2$, which is generated by the combustion, reacts with and is absorbed by the desulfurizing agent 103.

A combustion gas 201 generated at the pressurized fluidized-bed combustion furnace 1 is dedusted by a cyclone 2. Dust 202 which is removed from combustion gas 201 is discharged out of the system. Combustion gas 301, after being dedusted, bifurcates to enter a filter container 3a, 3b respectively. In the filter container 3a, 3b, there are provided a multiplicity of ceramics filters 31a, 31b. Each of the ceramics filters 31a, 31b is tubular and is constructed in such a gas flow structure that a cyclone outlet gas (combustion gas) 302, 303 is led thereinto and the combustion gas passes therethrough from an inside to an outside thereof.

When the combustion gas 302, 303 passes through the ceramics filter 31a, 31b, the dust contained in the combustion gas 302, 303 is collected on an inner surface of the ceramics filter 31a, 31b. The dust so collected on the ceramics filter is peeled off by a back wash gas 306, 307, which flows periodically, and falls down in the ceramics filter 31a, 31b to a bottom portion of the filter container 3a, 3b to be recovered therefrom at 308, 309. In a buffer tank 33, there is stored a pressurized air 304, thus the back wash gas 306, 307 is supplied into the filter container 3a, 3b by opening an closing a valve 32a, 32b periodically so as to allow the pressurized air from the buffer tank 305 to flow through valve 32a, 32b.

Combustion gases 401, 402, having passed through the ceramics filter 31a, 31b, joins together outside of the filter containers 3a, 3b, to form a combustion gas 403, which is introduced into a gas turbine 4. The combustion gas 403 drives the gas turbine 4 to thereby generate an electric power by a generator 10. A combustion gas 501 at the gas turbine outlet is supplied into a waste heat recovery boiler 5 so that a sensible heat of the combustion gas 501 is converted into steam energy 701 by a heat exchanger 9. The steam 701 drives a steam turbine 7 to thereby generate electric power by a generator 11. Steam 801 which has come out of the steam turbine is changed to become a condensate by a condenser 8 and water 901 thereof is pressurized again to be supplied to the heat exchanger 9 of the waste heat recovery boiler 5. The combustion gas 601 which has passed through the waste heat recover boiler 5 is discharged into the air from a stack 6.

In the pressurized fluidized-bed combustion power generation system, if a load is increased, the temperature of the combustion gas 301 is elevated corresponding to the load. Thus, the temperature of the ceramics filter 31a, 31b is also elevated. Generally that temperature is approximately 650° C. at a load of 50%, approximately 750° C. at a load of 75% and approximately 830° C. at the load of 100%. When a B type limestone is used for the desulfurizing agent 103 in the prior art system shown in FIG. 7, no change over time is caused in the differential pressure in the ceramics filter 31a, 31b at the temperature of 650° C. However, in a case where the load is increased and the temperature of the ceramics filter 31a, 31b exceeds 750° C., a phenomenon is caused in which the differential pressure in the ceramics filter 31a, 31b is elevated over time. If the temperature is set to a temperature at which the differential pressure in the ceramics filter 31a, 31b starts to become elevated, the differential pressure in the ceramics filter 31a, 31b continues to increase until the operation must be finally stopped.

Elevation of the filter back wash pressure is effective as one of the methods for reducing the filter differential pressure. However, to elevate the filter back wash pressure invites a breakage of a seal portion of the ceramics filter 31a, 31b or a breakage of a pressure structure portion of the filter container 3a, 3b. Hence, there is an upper limit value in the filter back wash pressure. Even if the back wash pressure is set to a maximum back wash pressure within a permissible range, if the B type limestone is used and the filter temperature is between 750° C. and 810° C., the filter differential pressure continues to increase over time, and there is a problem that the operation of the pressurized fluidized-bed combustion power generation system must be finally stopped.

SUMMARY OF THE INVENTION

It is therefore a basic object of the present invention to provide a dust collecting apparatus in which a specific mineral is mixed into an inlet gas of the dust collecting apparatus to thereby suppress the rate of increase of a differential pressure in a ceramics filter and eliminate the need to stop the operation of a pressurized fluidized-bed combustion power generation system. It is also an object of the present invention to provide an operation method of the dust collecting apparatus in which the supply amount of the mineral is regulated.

In order to attain these objects, the present invention is featured in providing a dust collecting apparatus and method as follows.

A first dust collecting apparatus is provided that contains a ceramics filter for dedusting a combustion gas that is channeled to the dust collecting apparatus from a combustion furnace. A means is also provided for supplying a de-sticking agent comprising at least one mineral of a group including MgO, MgCO$_3$ or Mg(OH)$_2$ into an inlet gas of the dust collecting apparatus. It is to be noted that the de-sticking agent may be supplied into the inlet gas in the form of a substance containing MgO, MgCo$_3$ and Mg(OH)$_2$.

A dust collecting apparatus similar to the first dust collecting apparatus is provided, wherein the supplying means is a limestone supplying apparatus for the combustion furnace.

A dust collecting apparatus similar to the first dust collecting apparatus is provided, wherein the supplying apparatus is connected to an inlet or an outlet of a cyclone which is provided at an outlet of the combustion furnace.

A dust collecting apparatus similar to the first dust collecting apparatus is provided, wherein the mineral or the substance containing the mineral is supplied into the combustion furnace in a water slurry.

An operation method of any of the above dust collecting apparatus is also provided, wherein a supply amount of the mineral or the substance containing the mineral is regulated corresponding to a front and back differential pressure in the ceramics filter or an inlet gas flow rate of the dust collecting apparatus.

In the dust collecting apparatus of any of the embodiments of the invention described above, at least one mineral of MgO, MgCO$_3$ or Mg(OH)$_2$, either in independent form or in a substance containing that mineral (a de-sticking agent), is supplied into the dust collecting apparatus by a supplying means. The supplying means in the apparatus of the second embodiment is a supplying device for limestone as a desulfurizing agent for the combustion furnace. In the apparatus of the third embodiment, the supplying apparatus is connected to the inlet or outlet of the cyclone. In the apparatus of the fourth embodiment, the mineral or the substance is supplied in a water slurry. The MgO-containing mineral or substance (de-sticking agent) so supplied enters the ceramics filter together with the combustion gas. Thus, the filter differential pressure elevation rate is suppressed. The more MgO that is supplied, the more remarkable the effect becomes. Thereby, stoppage of the pressurized fluidized-bed combustion power generation system can be avoided.

Also, in the operation method described above, the supply amount of any one mineral of MgO, MgCO$_3$ or Mg(OH)$_2$, either alone or in a substance containing the mineral, can be regulated. Therefore, the supply amount of the mineral or substance can be set to an optimum amount so as to stabilize filter differential pressure from time to time.

DESCRIPTION OF THE PREFERRED EMBODIMENTS

Figure 1:
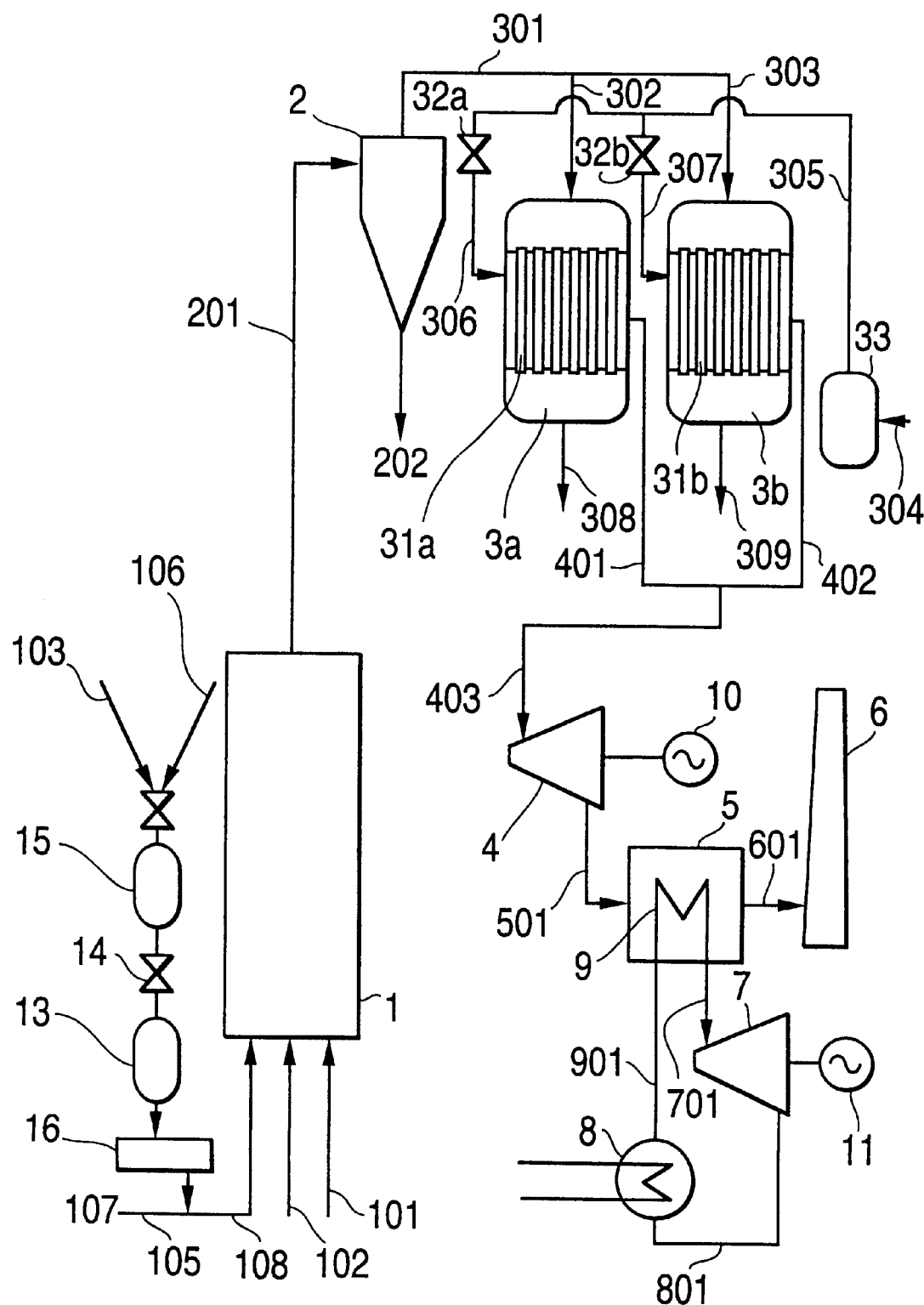
FIG. 1 is a schematic diagram of a pressurized fluidized-bed combustion power generation system to which a dust collecting apparatus according to a first embodiment of the present invention is applied.
Figure 7:
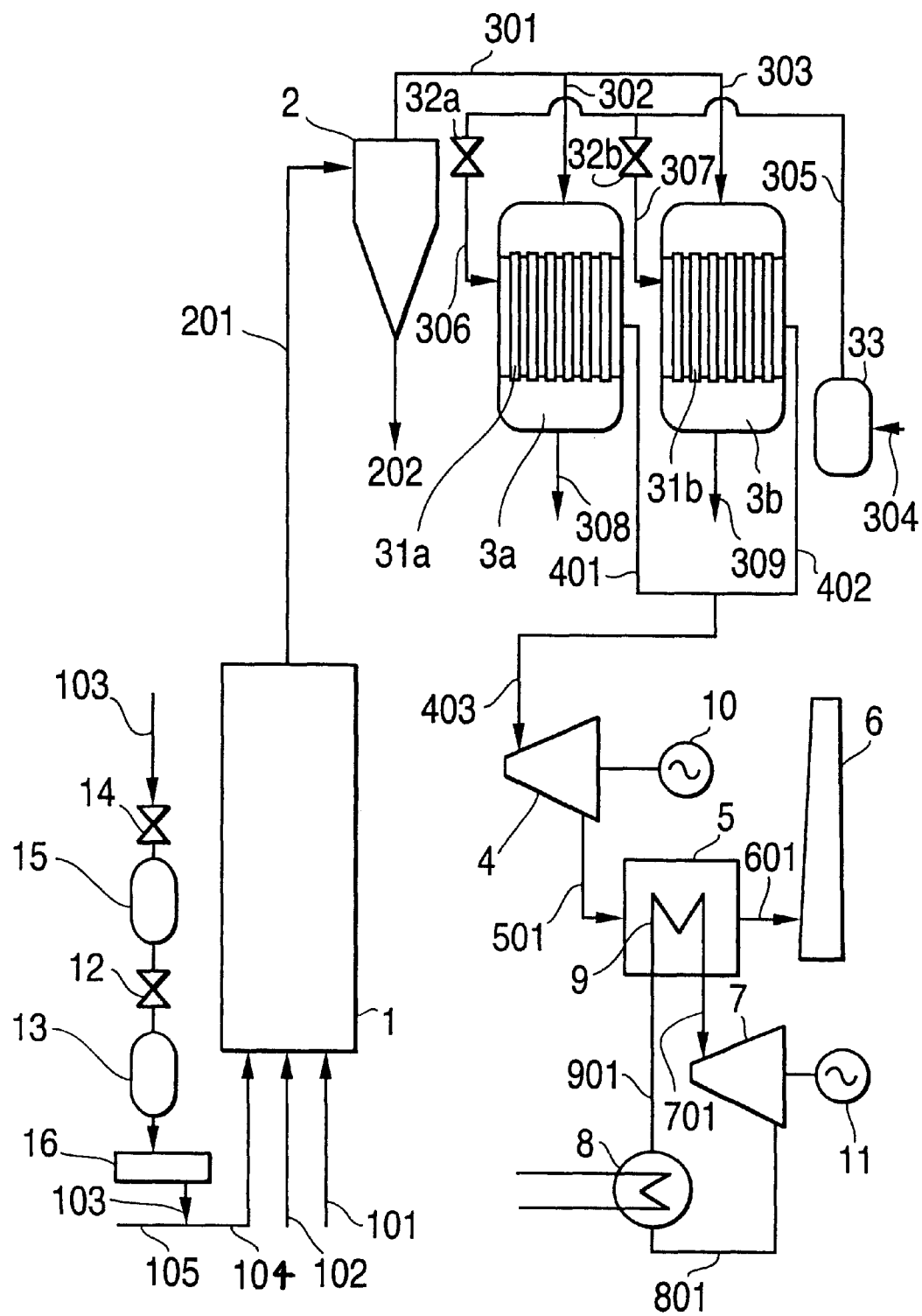
FIG. 7 is a schematic diagram of pressurized fluidized-bed combustion power generation system to which a prior art dust collecting apparatus is applied.

Herebelow, embodiments according to the present invention will be described with reference to the drawings. FIG. 1 is a schematic diagram of a pressurized fluidized-bed combustion power generation system to which a dust collecting apparatus according to a first embodiment of the present invention is applied. In FIG. 1, what is different from the prior art example shown in FIG. 7 is that there is provided a means for supplying a mixture 107 of limestone 103 and an MgO or MgCO$_3$-containing mineral 106 into a pressurized fluidized-bed combustion furnace 1. The remaining construction is the same as that of FIG. 7 and a description thereof is omitted.

If an MgO-containing rate in the mixture 107 is small, while a reduction of the differential pressure elevation rate may be expected, stopping of the differential pressure elevation may not be expected. Corresponding to the differential pressure elevation rate, the rate of MgO in the limestone changes. Generally, if the rate of mgo relative to CaO is approximately 1 to 15%, a reduction of the difference pressure elevation rate can be expected.

However, if the differential pressure elevation rate is very large, it is considered preferable to increase the MgO concentration. Also, it is possible to provide a metering means for regulating the supply amount of the MgO- or MgCO$_3$-containing mineral 106 although not shown in FIG. 1.

Next, by using a shear-force-between-particles measuring device, shear forces between particles have been measured on the limestone and the mixture of limestone and various minerals in a CO$_2$ atmosphere by the following procedures.

Figure 2:
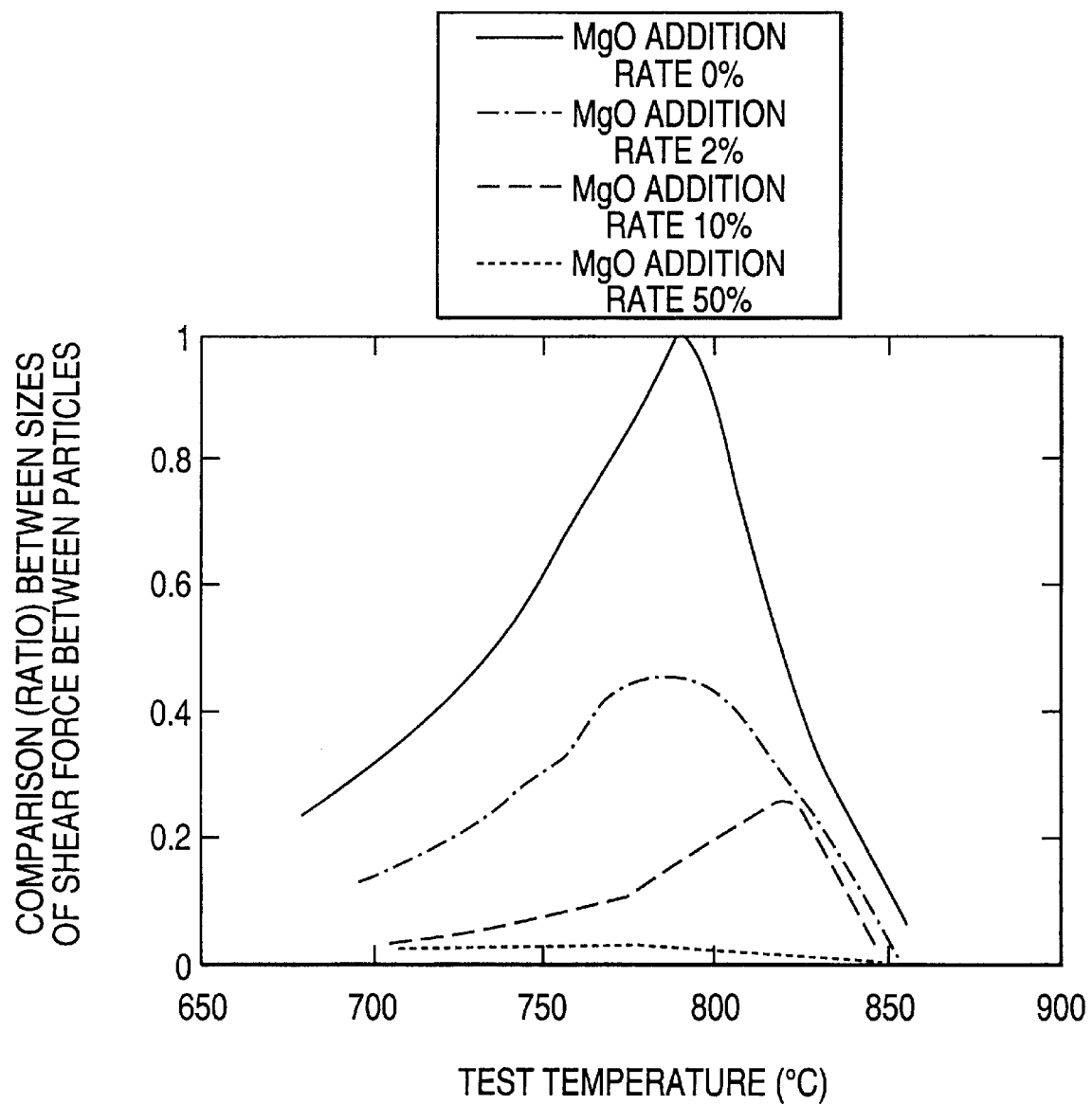
FIG. 2 shows a comparison (ratio) between sizes of shear force between particles on a mixture of CaO and MgO as results of measuring in a CO$_2$ atmosphere in the dust collecting apparatus of the present invention.

FIG. 2 shows a comparison (ratio) between sizes of the shear force between particles as measured. A vertical axis of FIG. 2 is expressed with respect to a reference point representing the shear force between particles at a temperature of 790° C. in a case of CaO only (a case where the MgO addition rate is 0% in FIG. 2). In the case of CaO only, the shear force between particles has been increased at a temperature of 770° C. to 880° C. This phenomenon is similar to the differential pressure elevation characteristics in an actual filter. Various minerals have been added to CaO, and it has been found that the shear force between particles lowers as the amount of MgO that is added increases, as shown in FIG. 2.

Figure 3:
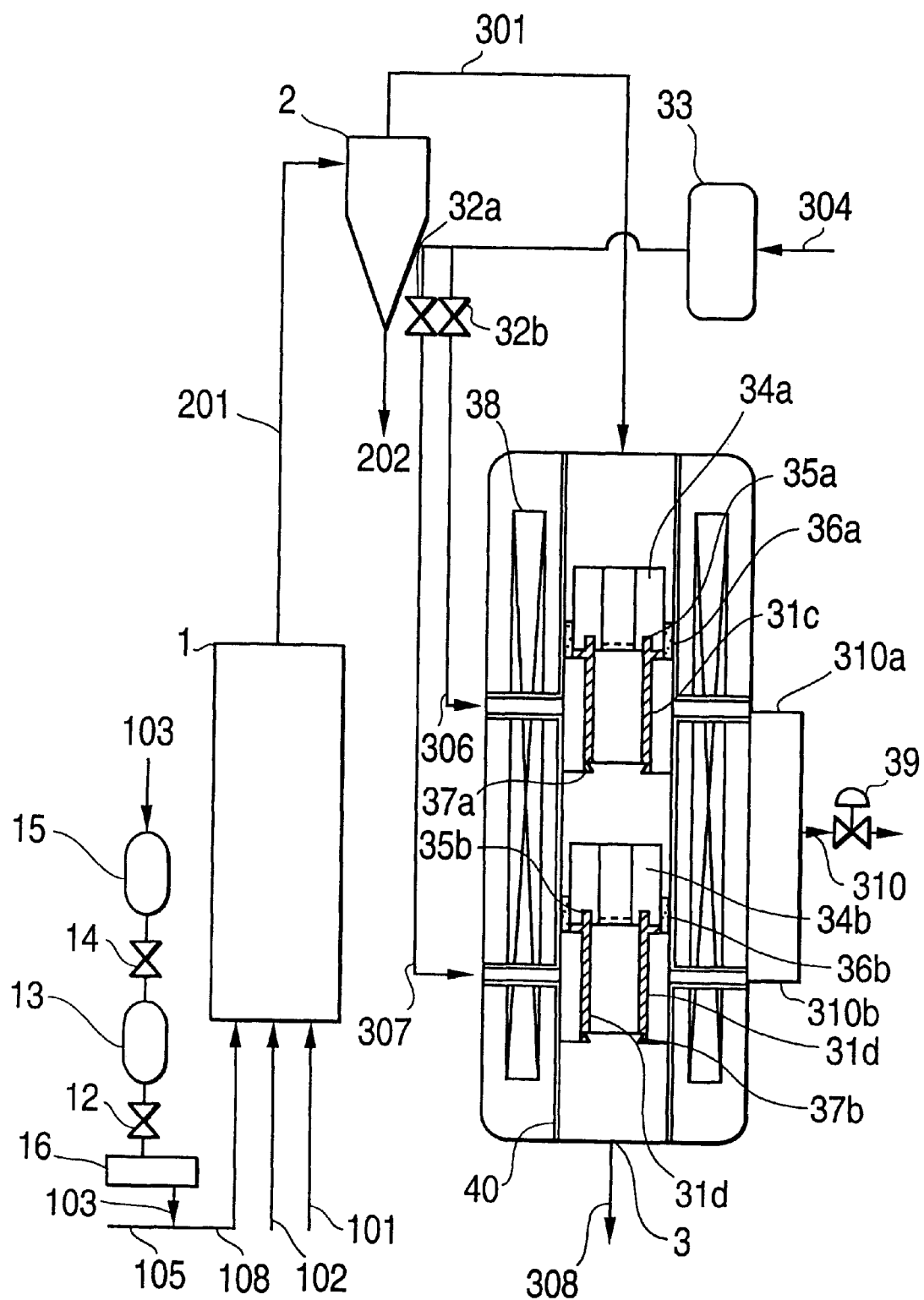
FIG. 3 is a schematic diagram and structural view of a test apparatus of the dust collecting apparatus of the present invention for verifying that a filter differential pressure lowers with the addition of MgO.

It has been found from the result of the shear force measured as aforementioned that the addition of MgO mitigates the sticking force of particles. In order to clarify the relationship between this phenomenon and the filter differential pressure and to verify the effect of adding MgO, a filter evaluation test has been done on an apparatus of a bench test size as shown in FIG. 3.

The filter test apparatus consists of a pressurized fluidized-bed combustion furnace 1, a cyclone 2, a filter container 3 and a pressure regulating valve 39 for regulating the pressure of the system. In the filter container 3, there is contained a ceramics filter 31c, 31d. On an upper portion of the ceramics filter 31c, 31d, there is provided a weight 34a, 34b made of metal via a packing 35a, 35b. There is also provided a seal packing 36a, 36b, 37a, 37b between the ceramics filter 31c, 31d and a filter holding tube 40.

The seal packing 36a, 36b, 37a, 37b serves to seal a combustion gas 301 so that the combustion gas 301 may not flow so as to by-pass the ceramics filter 31c, 31d, and also serves to protect the ceramics filter 31c, 31d so that the ceramics filter 31c, 31d does not collide directly with the filter holding tube 40 by shock caused when a back wash gas 306, 307 is introduced for backwashing the ceramics filter 31c, 31d. Because the apparatus is small test apparatus having a large heat loss, there is provided an annular electric furnace 38 surrounding the ceramics filter 31c, 31d for maintaining the warmth of the ceramics filter 31c, 31d.

The filter differential pressure changes as gas consistency and gas flow rate change. In order to compare changes in resistance values when gas flows in the filter at different temperatures, it is necessary to compensate for changes caused by the gas consistency and gas flow rate. Supposing that the filter differential pressure can be expressed by the following equation, the dirt progress rate in the equation shows that the flowability of gas in the filter and the resistance of the filter can be compared by the value of the dirt progress rate:

(Ceramics filter differential pressure)=(Dirt progress rate value)× (Gas flow rate)×(Gas consistency)

Figure 4:
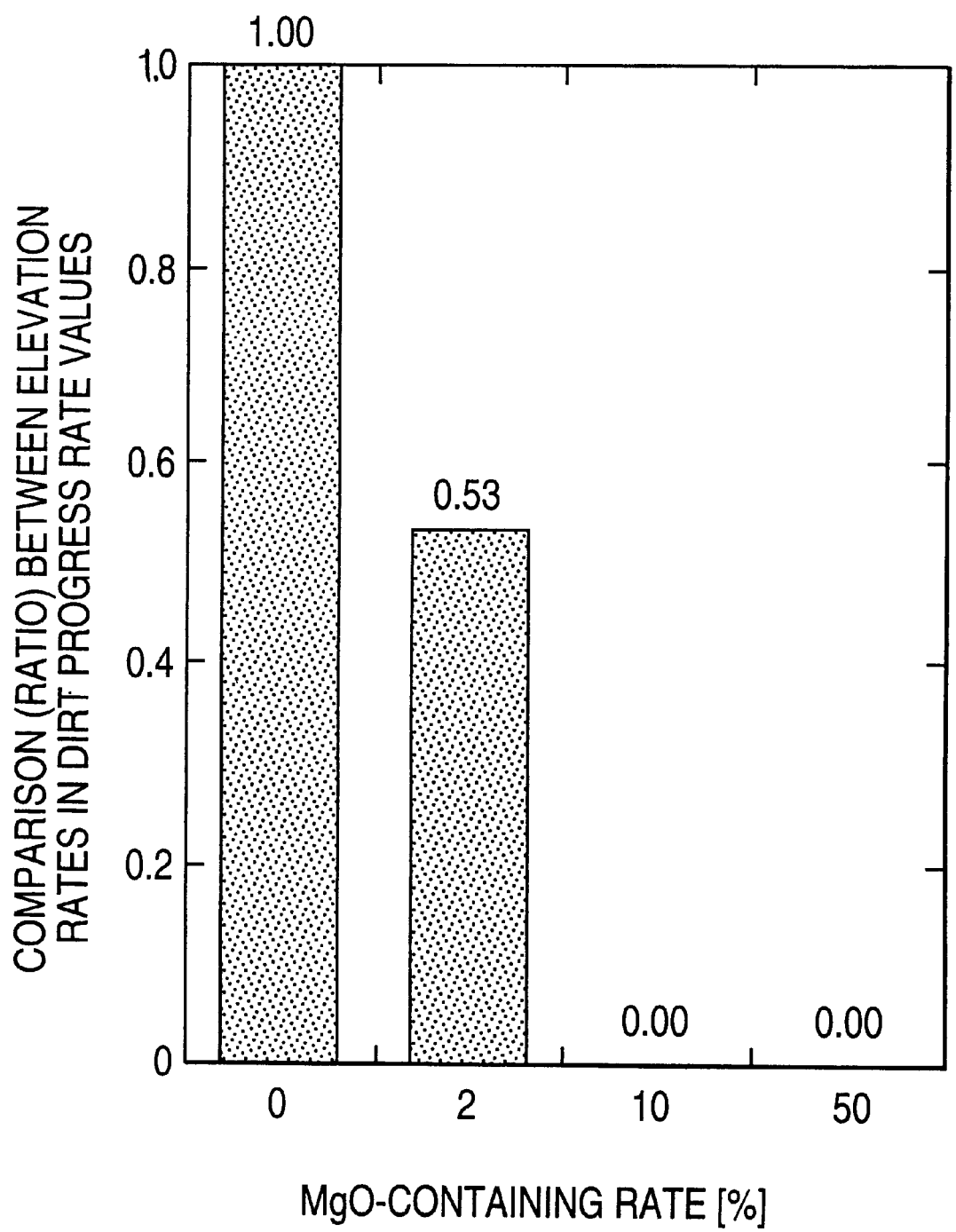
FIG. 4 is a graph showing test results in which the differential pressure change in a case of the addition of MgO into limestone is expressed as a comparison (ratio) between elevation rates in dirt progress rate values.

Further influences on the dirt progress rate value by the addition of MgO and amount added have been investigated, and procedures thereof are shown below:

i) In the experiments, A-type coal of approximately 8 kg/h and B-type limestone of 0.5 kg/h are supplied so as to create a pressurized fluidized-bed combustion and so that a combustion gas of approximately 80 Nm$^3$/h has been produced. If MgO is to be added, it is mixed into the B type limestone.

ii) Dedusting is done by a cyclone 2 so that the dust concentration of the combustion gas 301 at an outlet of the cyclone 2 is set to 0.2 to 0.5 g/Nm$^3$, and the combustion gas 301 is introduced into the filter container 3.

iii) Pressure in the filter container 3 is set to 10 ata and filter temperature is regulated by the annular electric furnace 38 so as to be 650° C.

iv) The filter differential pressure and gas amount at 650° C. are measured over time. Although not shown in FIG. 3, an orifice is provided in the combustion gas outlet piping lines 310a, 310b (which combine to form combustion gas outlet piping line 310) and measuring of the gas quantity is done by measuring a resistance therethrough. At 650° C., the filter differential pressure has been stabilized to approximately 1000 mm H$_2$O.

v) Then, the filter temperature is elevated to 750° C. and the filter differential pressure gas amount are measured. The filter differential pressure at 750° C. is measured overtime. A comparison (ratio) between the elevation rate of the dirt progress rate values obtained by the above procedures in a case where only the B-type limestone is provided only at approximately 750° C., and cases where MgO is added in quantities of 2%, 10% and 50% (all in weight %) to the B type limestone at the same temperature is shown in FIG. 4.

As described when shear forces in the particles of CaO or a mixture of CaO and other minerals in a high temperature gas atmosphere are measured, the results indicate MgO to be an additive for reducing the sticking ability of particles containing CaO, and its effectiveness has been found by tests using a test apparatus in simulation of an actual apparatus.

Next, the function of reducing the sticking ability of particles containing CaO by addition of MgO will be described. If CaO particles or CaCO$_3$ particles are viewed molecularly, a portion of Ca molecules is charged positively and a portion of O molecules is charged negatively. The portion separated electrically as positive or negative molecules easily attracts the portion separated reversely as negative or positive molecules, respectively. In the case of SiO$_2$ or Al$_2$O$_3$, portions therein are charged positively and negatively, respectively, although they have different strengths. Hence, nothing acts to mitigate an electrical attraction. However, in the case MgO, the Mg atom is so small as compared with the surrounding O atom and the structure of MgO is as if only the O atom can be seen from outside. Therefore, the entire MgO surface is charged negatively, and if the MgO molecule enters between particles of which charges are distributed negatively and positively, there occur repulsions between these distributed charged particles, the result is that there is prevention of sticking between CaO particles or CaCO$_3$ particles.

According to the first embodiment as described above, the mixture 107 of the limestone 103 and the MgO- or MgCO$_3$-containing mineral 106 is supplied into the pressurized fluidized-bed combustion furnace 1. The combustion gas 201 is dedusted by the cyclone 2 and the dedusted combustion gas 301 is supplied into the filter container 3a, 3b. Thus, by adding MgO, the filter differential pressure elevation rate can be suppressed as shown in FIG. 4. Further, it has been found that the more MgO that is supplied the more remarkable the effect becomes.

Figure 5:
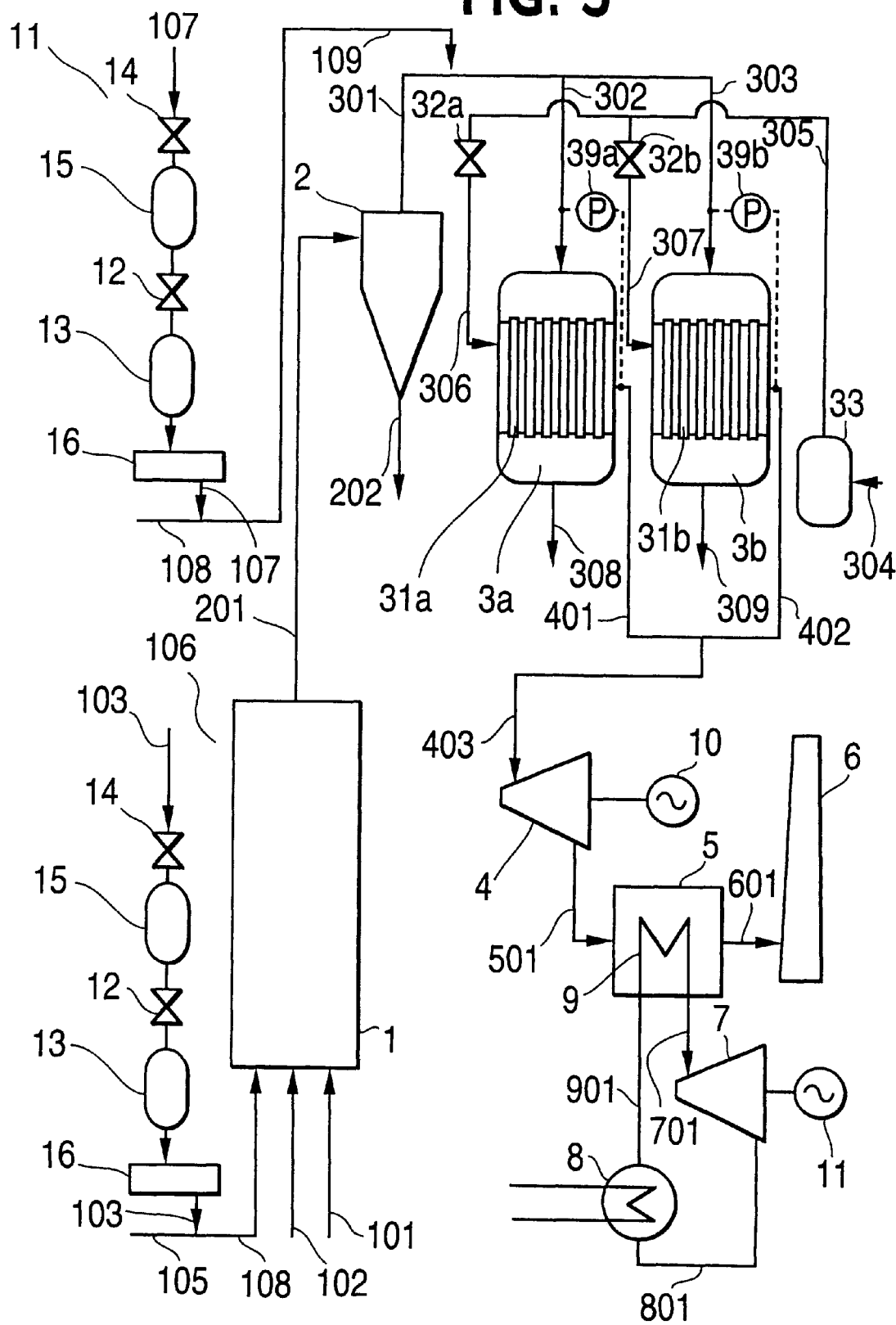
FIG. 5 is a schematic diagram of a pressurized fluidized-bed combustion power generation system to which a dust collecting apparatus according to a second embodiment of the present invention is applied.

FIG. 5 is a schematic diagram of a pressurized fluidized-bed combustion power generation system to which a dust collecting apparatus according to a second embodiment of the present invention is applied. In FIG. 5, what is different from the prior art example shown in FIG. 7 is that a hopper unit is provided at an outlet of cyclone 2. The hopper unit acts as an MgO adding device and consists of a hopper 15, 13, a valve 14, 12 a feeder 16, and a metering device 11. Also, differential pressure gauges 39a, 39b are provided for measuring the differential pressure in ceramics filters 31a, 31b. The remaining construction is the same as that of the prior art example shown in FIG. 7.

In the second embodiment, MgO concentration can be regulated arbitrarily by the metering device 11. While the differential pressure in the ceramics filter 31a, 31b is being measured by the differential pressure gauge 39a, 39b, a sufficient amount of MgO to stabilize the differential pressure in the ceramics filter is added from time to time. It is to be noted that in order to mix the dust in the gas and the MgO-containing mineral well, the MgO (Mg mixture 109) may be supplied at the inlet position of the cyclone 2 at 201 instead of the outlet position at 301 as shown.

Figure 6:
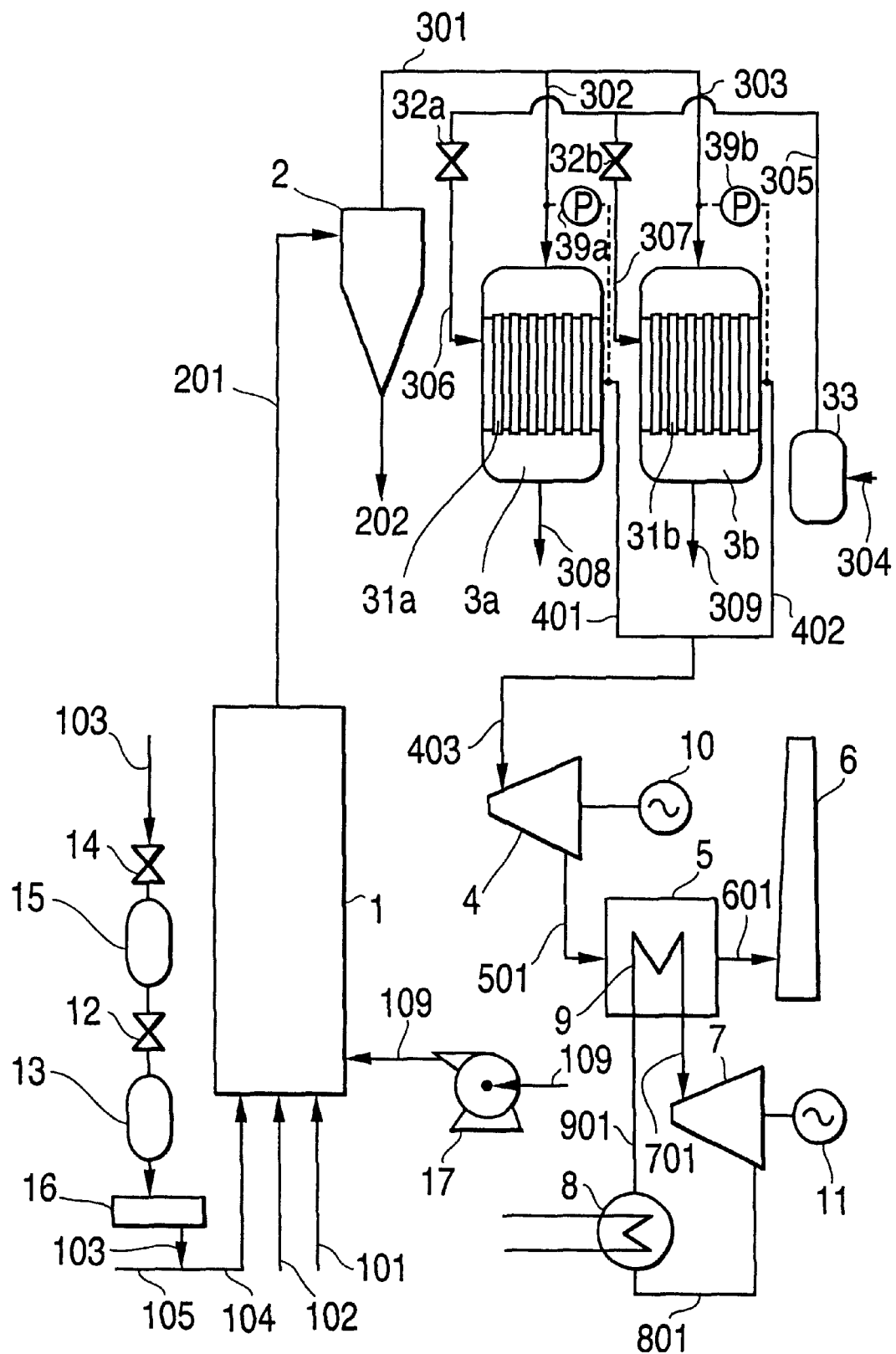
FIG. 6 is a schematic diagram of a pressurized fluidized-bed combustion power generation system to which a dust collecting apparatus according to a third embodiment of the present invention is applied.

FIG. 6 is a schematic diagram of a pressurized fluidized-bed combustion power generation system to which a dust collecting apparatus according to a third embodiment of the present invention is applied. In FIG. 6, what is different from the prior art example shown in FIG. 7 is that there are provided a metering pump 17 for supplying a water slurry of Mg(OH)$_2$ (Mg mixture 109) into a pressurized fluidized-bed combustion furnace 1. In addition, differential pressure gauges 39a, 39b for measuring the differential pressure in a ceramics filter 31a, 31b are also provided. The remaining construction is the same as that of the prior art example shown in FIG. 7.

In the third embodiment, an Mg(OH)$_2$ water slurry (Mg mixture 109) is supplied into the pressurized fluidized-bed combustion furnace 1 by the metering pump 17. Mg(OH)$_2$ in the Mg(OH)$_2$ water slurry decomposes in the pressurized fluidized-bed combustion furnace 1 to generate MgO and H$_2$O so that fine particles of MgO are supplied into the ceramics filter 31a, 31b. Also, while the differential pressure in the ceramics filter 31a, 31b is being measured by the differential pressure gauge 39a, 39b, as in the second embodiment, a sufficient amount of MgO to stabilize the differential pressure in the ceramics filter is added from time to time.

According to the second and third embodiments as described above, as in the first embodiment, the filter differential pressure elevation can be suppressed by the addition of MgO. The more MgO that is added, the greater the effect becomes.

It is understood by those skilled in the art that the foregoing description are preferred embodiments of the disclosed apparatus and that various changes and modifications may be made in the invention without departing from the spirit and scope thereof.

We claim:

1. A method of removing dust from a combustion gas, comprising:

channeling said combustion gas to a dust collecting apparatus including a ceramics filter, said ceramics filter having an inlet end and an outlet end wherein a differential pressure across said ceramics filter is defined as a difference between an inlet pressure of said combustion gas at said inlet end and an outlet pressure of said combustion gas at said outlet end, said combustion gas being channeled to said dust collection apparatus at an inlet flow rate;

supplying a de-sticking agent comprising at least one of a group consisting of MgO, MgCO$_3$, and Mg(OH)$_2$ into said combustion gas upstream of said ceramics filter; and regulating said supplying of said de-sticking agent in relation to one of said differential pressure across said ceramics filter and said inlet flow rate of said combustion gas so as to reduce an attraction between particles in said ceramics filter and reduce said differential pressure across said ceramics filter.

2. The method of claim 1, wherein said regulating of said supplying of said de-sticking agent is in relation to said differential pressure across said ceramics filter.

3. The method of claim 2, wherein said regulating of said supplying of said de-sticking agent comprises increasing an amount of said de-sticking agent as said differential pressure across said ceramics filter increases.

4. The method of claim 1, wherein said regulating of said supplying of said de-sticking agent is in relation to said inlet flow rate of said combustion gas.

5. The method of claim 1, wherein said dust collecting apparatus further includes a cyclone having an inlet and an outlet, said cyclone being provided upstream of said ceramics filter, said supplying of said de-sticking agent comprises supplying said de-sticking agent at one of said inlet and said outlet of said cyclone.

6. A method of removing dust from a combustion gas, comprising:

channeling said combustion gas from a combustion furnace to a dust collecting apparatus including a ceramics filter, said ceramics filter having an inlet end and an outlet end wherein a differential pressure across said ceramics filter is defined as a difference between an inlet pressure of said combustion gas at said inlet end and an outlet pressure of said combustion gas at said outlet end, said combustion gas being channeled to said dust collection apparatus at an inlet flow rate;

supplying a de-sticking agent comprising at least one of a group consisting of MgO, MgCO$_3$, and Mg(OH)$_2$ into said combustion furnace; and regulating said supplying of said de-sticking agent in relation to one of said differential pressure across said ceramics filter and said inlet flow rate so as to reduce an attraction between particles in said ceramics filter and reduce said differential pressure across said ceramics filter.

7. The method of claim 6, wherein said supplying of said de-sticking agent comprises supplying limestone into said combustion furnace.

8. The method of claim 6, wherein said supplying of said de-sticking agent comprises supplying a water slurry into said combustion furnace.

9. The method of claim 6, wherein said regulating of said supplying of said de-sticking agent is in relation to said differential pressure across said ceramics filter.

10. The method of claim 9, wherein said regulating of said supplying of said de-sticking agent comprises increasing an amount of said de-sticking agent as said differential pressure across said ceramics filter increases.

11. The method of claim 6, wherein said regulating of said supplying of said de-sticking agent is in relation to said inlet flow rate of said combustion gas.

* * * * *